Patented Dec. 5, 1933

1,938,029

UNITED STATES PATENT OFFICE 1,938,029

MANUFACTURE OF AMINOANTHRAQUINONE-NITRILES

Max Kugel, Leverkusen-on-the-Rhine, Germany, assignor to General Aniline Works, Inc., New York, N. Y., a corporation of Delaware No Drawing. Application February 27, 1931, Serial No. 518,918, and in Germany March 1, 1930

8 Claims. (Cl. 260—60)

The present invention relates to a process of preparing aminoanthraquinone-nitriles and to the new products obtainable by said process.

I have found that new aminoanthraquinone-nitriles are obtainable by reacting upon a compound of the probable formula:—

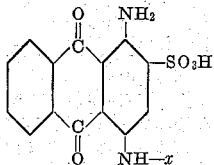

wherein $x$ means hydrogen, alkyl, aralkyl, aryl or hydroaryl, or a water soluble salt thereof with a water soluble salt of hydrocyanic acid, such as sodium cyanide, potassium cyanide, ammonium cyanide, etc. The reaction is performed in aqueous solution while heating the reaction mixture, advantageously to a temperature surmounting about 65° C. It is impossible to give a definite upper temperature limit at which my process is still operable. I only can say that any temperature above about 65° C. is operable up to that temperature, at which decomposition of the aminoanthraquinone-nitriles being formed begins to occur. This temperature will amount, for example, to about 115–120° C. in case of starting with 1.4-diaminoanthraquinone-2-sulfonic acid, whereas in most other cases temperatures up to 180° C. will be operable. Obviously, when working at a temperature above 100° C., the application of superatmospheric pressure will be necessary. The water soluble salts of hydrocyanic acid can be applied in molecular amount (calculated on the anthraquinone derivative employed), but better yields of the reaction products are obtained when applying the hydrocyanic acid salts in excess.

The products thus obtainable are probably aminoanthraquinone nitriles, but vary in their constitution depending as well on the starting anthraquinone derivative employed, as on the more special method of working. From 1.4-diaminoanthraquinone-2-sulfonic acid only 1.4-diaminoanthraquinone-2.3-dinitrile is most probably formed, whereas from the other starting materials falling within the general formula given above products corresponding to the general formula:—

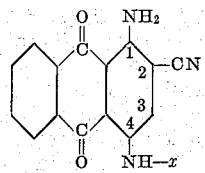

wherein $x$ means alkyl, aralkyl, aryl and hydroaryl, can be obtained in all cases. Besides or instead of these compounds other reaction products can be obtained in many cases. I cannot say with certainty, what exact constitution these products possess but I presume them to be products of the above formula, which, however, possess the CN group in the 3-position, or which are substituted by two cyano groups in 2.3-position.

They are mainly formed in case that rather mild conditions of working are applied, for example, while carrying out the reaction at a rather low temperature (but always above about 65° C.) or by shortening the time of reaction. Likewise, the application of rather small amounts of the hydrocyanic acid salts tends in some cases to facilitate the formation of the 3-nitriles or 2.3-dinitriles in question. The 2-nitriles of the formula given above form dark blue crystals dissolving in strong sulfuric acid to yield colorless to various colored (for example, brownish-yellow, reddish-brown, blue to green) solutions, which solutions change in color upon the addition of formaldehyde. The new compounds dissolve in pyridine with a greenish-blue coloration. They are soluble in the usual organic solvents, rather difficultly soluble at normal temperature in ethyl-ether, alcohol and benzene. The 3-nitriles or 2.3-dinitriles resemble those of the 2-cyano-anthraquinone derivatives to a far reaching extent, but differ more or less in view of the coloration of their solution in strong sulfuric acid, especially when formaldehyde is added to the solution. I cannot say with certainty, whether these nitriles generally are the products formed first during my process; all I can say is that I could isolate same in many cases. In many cases they can be transformed into the anthraquinone-2-nitrile derivatives by a further treatment with an aqueous solution of a hydrocyanic acid salt.

It may be stated that my invention comprises all nitriles which are obtainable by reacting upon a compound of the formula given above with a water-soluble salts of hydrocyanic acid in aqueous solution at a temperature above about 65° C., and that the broad claims are to be interpreted accordingly.

The following examples will illustrate my invention without, however, limiting it thereto, the parts being by weight:—

*Example 1.*—20 parts of the sodium salt of 1-amino - 4 - hexahydroanilidoanthraquinone - 2 - sulfonic acid are heated with 40 parts of potassium cyanide and 1000 parts of water in a closed vessel for six to eight hours to a temperature of 110–115° C., while stirring. After cooling, the crystalline product having separated is filtered by suction, washed with hot water, dried and transformed into its brownish-red sulfate by means of 12 parts its weight of sulfuric acid (65%) at a temperature of 40–45° C. The sulfate forms small orange crystals, which are filtered and decomposed with water at 30° C. A blue compound is thus obtained crystallizing from glacial acetic acid in form of blue needles and melting at 211–212° C. It dissolves in pyridine with a clear greenish-blue coloration, in concentrated sulfuric acid with a brownish-yellow coloration, turning to a dull blue at the addition of paraformaldehyde. When pouring the sulfuric acid solution into water, greenish-blue flakes separate. When heating the compound with concentrated hydrochloric acid in a sealed tube to 120° C., a carboxylic acid is obtained, being identical to the carboxylic acid obtainable by condensing 1-amino-4-bromoanthraquinone-2-carboxylic acid with hexahydroaniline. From this it results that the new compound is the 1-amino-2-cyano-4-hexahydroanilidoanthraquinone. By saponification of the 1-amino-2-cyano-4-hexahydroanilidoanthraquinone with strong sulfuric acid at about 100° C. the corresponding carbonamide can be obtained, which dyes acetate silk a bright greenish-blue.

*Example 2.*—20 parts of the sodium salt of 1-amino-4-hexahydroanilidoanthraquinone-2-sulfonic acid are heated to 105° C. with 30 parts of potassium cyanide and 1000 parts of water for 1 hour in a closed vessel, while stirring. After cooling, the reaction mixture is filtered, the residue washed with hot water, dried and transformed into the sulfate of the reaction product, by treating the latter with the 15 fold quantity of sulfuric acid (66%) at a temperature of 40–45° C. After cooling, the brownish-red sulfate having separated is filtered at about 30° C. and decomposed with water. A blue compound is thus obtained, which crystallizes from toluene in long blue needles, which melt at 239–240° C. The new compound dissolves in pyridine with a clear greenish-blue coloration, in concentrated sulfuric acid with a weakly yellow coloration, which turns to violet at the addition of paraformaldehyde. When pouring the sulfuric acid solution into water reddish-blue flakes separate. The new compound is most probably the 1-amino-3-cyano-4-hexahydroanilidoanthraquinone. The presence of the nitrile group can be proved by carefully treating the new product with concentrated sulfuric acid at 100° C., whereby a carbonamide is formed dyeing acetate silk bright bluish-violet shades. When heating the new compound with water and potassium cyanide in an autoclave to 110–120° C. for some hours, it is transformed into the 1-amino-2-cyano-4-hexahydroanilidoanthraquinone of Example 1.

*Example 3.*—20 parts of the sodium salt of 1-amino-4-hexahydroanilidoanthraquinone-2-sulfonic acid are heated to boiling with 40 parts of potassium cyanide and 1000 parts of water for 2 hours. After that, the reaction mixture is filtered and the residue washed with hot water. The resulting product is identical to the reaction product of Example 2, melting at 239–240° C.

*Example 4.*—20 parts of the sodium salt of 1-amino - 4 - para - tolylaminoanthraquinone - 2 - sulfonic acid are heated with 40 parts of potassium cyanide and 1000 parts of water in a closed vessel to 130° C. for 6 hours, while stirring. After working up by filtering and washing the reaction product with water, the reaction product is crystallized from toluene. Blue crystals are thus obtained, dissolving in pyridine with a greenish-blue coloration, in concentrated sulfuric acid with a dull bluish-green coloration, which turns to reddish-blue at the addition of paraformaldehyde. The product is identical to the 1-amino-2-cyano-4-para-tolylaminoanthraquinone described in Example 2 of German Patent No. 486,875.

*Example 5.*—20 parts of the sodium salt of 1-amino - 4 - para - tolylaminoanthraquinone - 2 - sulfonic acid are heated with 20 parts of potassium cyanide and 1000 parts of water in a closed vessel to 110° C. for 6 hours, while stirring. After that, the reaction mixture is filtered, washed with hot water, dried and crystallized firstly from pyridine and finally from ortho-dichlorobenzene. Fine blue crystals are thus obtained, dissolving in pyridine with a greenish-blue coloration, in concentrated sulfuric acid with a brownish-red coloration, which soon turns to red and which is changed to olive at the addition of paraformaldehyde. When pouring the sulfuric acid solution into water, green flakes separate. The product is not identical to the product of Example 4, but likewise contains a nitrile group and no sulfonic acid group. It is most probably the 1-amino-3-cyano-4-para-tolylaminoanthraquinone.

*Example 6.*—20 parts of the sodium salt of 1-amino - 4 - anilidoanthraquinone - 2 - sulfonic acid are heated with 10 parts of potassium cyanide and 600 parts of water in a closed vessel to 140° C. for 4 hours, while stirring. After cooling, the reaction mixture is filtered, the residue washed with water, dried and crystallized from a little pyridine. The 1 - amino - 2 - cyano - 4 - anilidoanthraquinone thus obtained dissolves in pyridine with a greenish-blue coloration and in concentrated sulfuric acid with a green coloration.

The same compound is obtained when heating 20 parts of the above anthraquinone derivative with 40 parts of potassium cyanide and 1000 parts of water to 120° for 4 hours.

*Example 7.*—20 parts of the sodium salt of 1-amino - 4 - butylaminoanthraquinone - 2 - sulfonic acid are heated with 25 parts of potassium cyanide and 1000 parts of water to about 80–90° C., while stirring. After that, the reaction product having separated is filtered, washed with hot water and dried. It can be separated into the sulfates of two compounds. One of these sulfates crystallizes in leaflets, from which after decomposition with water a blue compound is obtained, which dissolves in strong sulfuric acid with a brownish-yellow coloration, which turns to bluish-green at the addition of paraformaldehyde.

The new compound dissolves in pyridine with a greenish-blue coloration, from which solution blue flakes are separated at the addition of water. The compound just described is most probably the 1-amino-2.3-dicyano-4-butylaminoanthraquinone. The other sulfate, which is more easily soluble in aqueous sulfuric acid, forms fine needles. By decomposition with water it is transformed into a blue compound, which dissolves in concentrated sulfuric acid, yielding a nearly colorless solution in thin layers, which becomes dull violet at the addition of formaldehyde. This coloration turns to reddish-blue after standing for some time. The compound dissolves in pyridine with a greenish-blue coloration. When pouring the pyridine solution into water, reddish-blue flakes separate. The compound can be crystallized from nitrobenzene, whereas the 1-amino-2.3-dicyano-4-butylaminoanthraquinone is more advantageously recrystallized from hot pyridine. The new compound is most probably the 1-amino-2-cyano-4-butylaminoanthraquinone.

*Example 8.*—20 parts of the sodium salt of 1-amino-4-methylaminoanthraquinone-2-sulfonic acid are heated with 24 parts of potassium cyanide in 1000 parts of water to about 85-95° C., while stirring. The reaction will be finished within about 3 hours. After that, the reaction mixture is filtered, the residue washed with hot water, dried and crystallized from boiling nitrobenzene, pyridine or ortho-dichlorobenzene. Blue needles are thus obtained, dissolving in pyridine with a greenish-blue coloration, in concentrated sulfuric acid with a brownish-yellow coloration, which turns to greenish-blue at the addition of paraformaldehyde. When pouring the sulfuric acid solution into water, blue flakes separate. The new compound is the 1-amino-2-cyano-4-methylaminoanthraquinone.

*Example 9.*—20 parts of the sodium salt of 1.4-diaminoanthraquinone-2-sulfonic acid are heated with 24 parts of sodium cyanide and 1000 parts of water to about 85-95° C. for about 2-4 hours, while stirring. The reaction product is filtered, washed with hot water, dried and crystallized from boiling nitrobenzene. Blue needles are thus obtained, dissolving in pyridine with a greenish-blue coloration, in concentrated sulfuric acid to yield a weakly yellowish-orange solution, turning to green at the addition of paraformaldehyde. When pouring the sulfuric acid solution into water, reddish-blue flakes separate. The product is probably the 1.4-diamino-2.3-dicyano-anthraquinone.

I claim:—

1. Process which comprises heating a compound of the probable formula:—

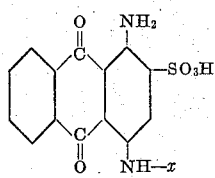

wherein $x$ means hydrogen, alkyl, aralkyl, aryl or hydroaryl, with a water soluble salt of hydrocyanic acid in aqueous solution to a temperature above about 65° C.

2. Process which comprises heating a compound of the probable formula:—

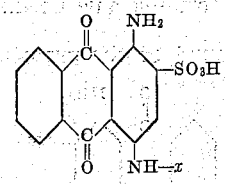

wherein $x$ means hydrogen, alkyl, aralkyl, aryl or hydroaryl with a compound of the formula $$y-CN$$

wherein $y$ means sodium, potassium or the ammonium radical, in aqueous solution to a temperature above about 65° C.

3. Process which comprises heating a compound of the probable formula:—

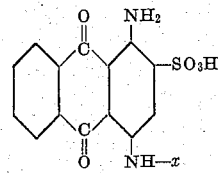

wherein $x$ means alkyl, aryl or hydroaryl, with a water soluble salt of hydrocyanic acid in aqueous solution to a temperature between about 65-180° C.

4. Process which comprises heating 1-amino-4-hexahydroanilidoanthraquinone-2-sulfonic acid with potassium cyanide in aqueous solution to a temperature between about 65-180° C.

5. The compounds of the following formula:

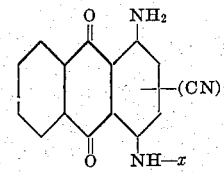

wherein $y$ stands for the number 1 or 2 and $x$ stands for hydrogen, alkyl, aralkyl or hydroaryl, said compounds forming blue crystals, dissolving in pyridine with a greenish-blue coloration and in strong sulfuric acid to yield colorless or various colored solutions which change in color at the addition of formaldehyde.

6. The compounds of the probable general formula:—

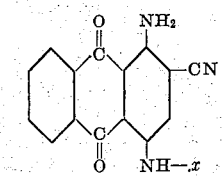

wherein $x$ means alkyl, aralkyl or hydroaryl, said compounds forming blue crystals, dissolving in pyridine with a greenish-blue coloration and in strong sulfuric acid to yield colorless or various colored solutions, which change in color at the addition of formaldehyde.

7. The compound of the probable formula:—

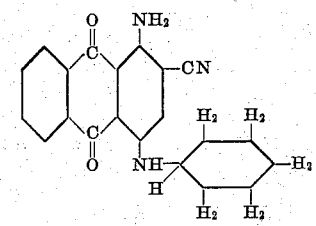

said compound forming blue needles, melting at 211–212° C.
8. The compound of the probable formula:—
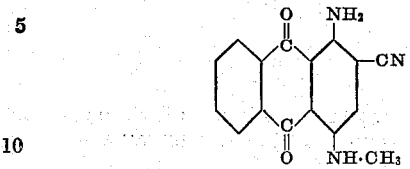
said compound forming blue needles, dissolving in pyridine with a greenish-blue coloration, in concentrated sulfuric acid with a brownish yellow coloration, which turns to greenish-blue at the addition of formaldehyde.
MAX KUGEL.